US006241798B1

(12) United States Patent
Dimitrov et al.

(10) Patent No.: US 6,241,798 B1
(45) Date of Patent: Jun. 5, 2001

(54) IRON SMELTING PROCESS AND PLANT ACCORDING TO THE MULTIPLE ZONE SMELTING PROCESS

(75) Inventors: Stefan Dimitrov; Norbert Ramaseder, both of Linz; Wilfried Pirklbauer, Niederneukirchen; Ernst Fritz, Linz; Heinz Müller, Neuhofen, all of (AT)

(73) Assignee: Voest-Alpine Industrieanlagenbau GmbH, Linz (AT)

( * ) Notice: Subject to any disclaimer, the term of this patent is extended or adjusted under 35 U.S.C. 154(b) by 0 days.

(21) Appl. No.: 08/930,220

(22) PCT Filed: Apr. 9, 1996

(86) PCT No.: PCT/AT96/00067

§ 371 Date: Feb. 12, 1998

§ 102(e) Date: Feb. 12, 1998

(87) PCT Pub. No.: WO96/32505

PCT Pub. Date: Oct. 17, 1996

(30) Foreign Application Priority Data

Apr. 10, 1996 (AT) .................................................. A 626/95

(51) Int. Cl.$^7$ ...................................................... C21B 11/10
(52) U.S. Cl. ......................... 75/10.63; 266/144; 266/177; 266/160; 266/212; 373/80
(58) Field of Search ..................... 266/142, 160, 266/212, 144, 177; 373/79, 80, 81; 75/10.63

(56) References Cited

U.S. PATENT DOCUMENTS

| 3,406,027 | * | 10/1968 | Bonilla et al. | 75/10.63 |
|---|---|---|---|---|
| 3,610,795 | | 10/1971 | Antoine . | |
| 3,752,663 | * | 8/1973 | Worner et al. | 75/10.42 |
| 5,471,495 | * | 11/1995 | Berger et al. | 373/82 |
| 5,513,206 | * | 4/1996 | Mori et al. | 373/80 |
| 5,531,805 | * | 7/1996 | Worner | 75/10.63 |
| 5,879,617 | * | 3/1999 | Fuchs et al. | 266/89 |

FOREIGN PATENT DOCUMENTS

| 295566 | 1/1972 | (AT) . |
|---|---|---|
| 376702 | 12/1984 | (AT) . |
| 220814 | 4/1910 | (DE) . |
| 1800131 | 5/1971 | (DE) . |
| 2900864 | 7/1979 | (DE) . |

(List continued on next page.)

*Primary Examiner*—Melvyn Andrews
(74) *Attorney, Agent, or Firm*—Ostrolenk, Faber, Gerb & Soffen, LLP

(57) ABSTRACT

In order to be able to process in an economical manner different iron carriers in varying quantitative compositions, a plant for the production of iron melts (4), in particular steel melts, such as crude steel melts, is equipped with an electric arc furnace vessel (1), a refining vessel (3) following upon the furnace vessel (1) via a weir (34) and including a bottom departing from the weir (34) in an at least partially downwardly inclined manner and an oxygen supply means (35, 36) as well as an iron melt tap (41) provided in its end region farther remote from the furnace vessel (1), a decanting vessel (2) following upon the furnace vessel (1) and having a common bottom (18) with the furnace vessel (1), said decanting vessel being provided with a slag tap (43) in its end region farther remote from the furnace vessel (1), a supply means (21) supplying liquid pig iron (20) and opening into the furnace vessel (1), a preheating shaft (5) supplying solid iron carries (7), said preheating shaft being arranged above the furnace vessel (1) and opening into the furnace vessel (1) via its lid (4) via a gas-permeable cooled shut-off means (6), and a charging shaft (10) arranged above the furnace vessel (1) and opening into the furnace vessel (1) via a gas-impermeable cooled shut-off means (11) (FIG. 1).

26 Claims, 2 Drawing Sheets

FOREIGN PATENT DOCUMENTS

| | | |
|---|---|---|
| 3609923 | 9/1987 | (DE) . |
| 0074270 | 3/1983 | (EP) . |
| 0240485 | 10/1987 | (EP) . |
| 0257450 | 3/1988 | (EP) . |
| 0385434 | 9/1990 | (EP) . |
| 0548041 | 6/1993 | (EP) . |
| WO 94/24506 | * 10/1994 | (EP) . |
| 1482929 | 6/1967 | (FR) . |
| 2611876 | 9/1988 | (FR) . |
| 2634787 | 2/1990 | (FR) . |
| 1141560 | 1/1969 | (GB) . |
| 2115011 | 9/1983 | (GB) . |

* cited by examiner

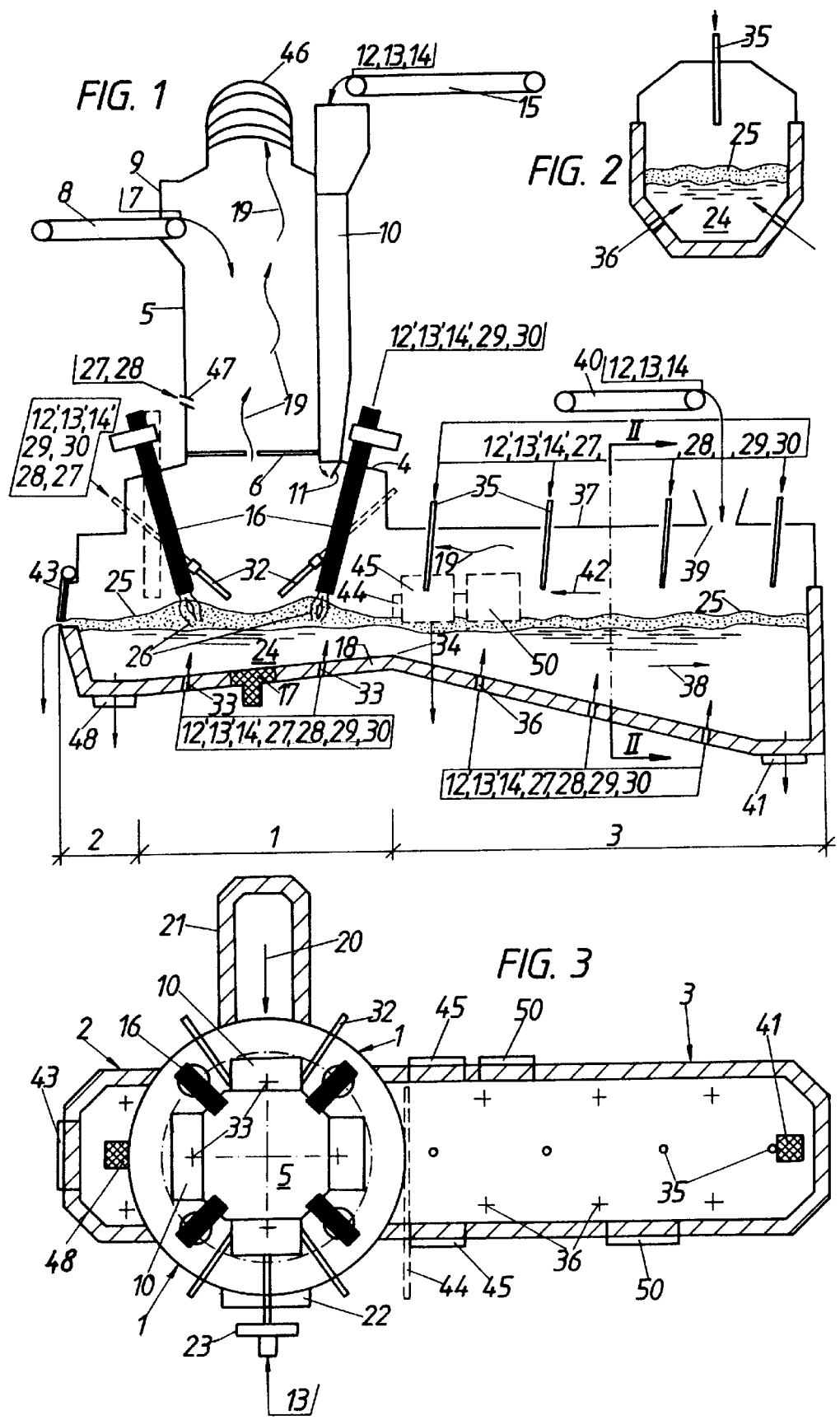

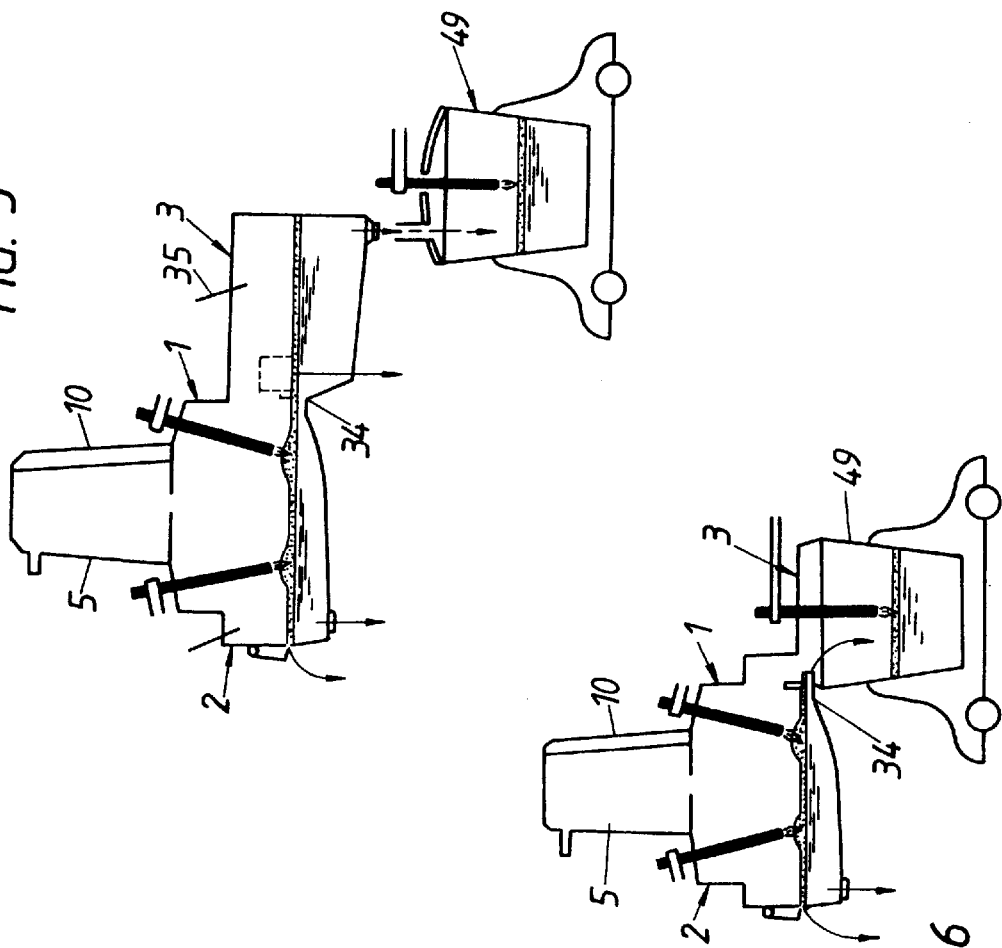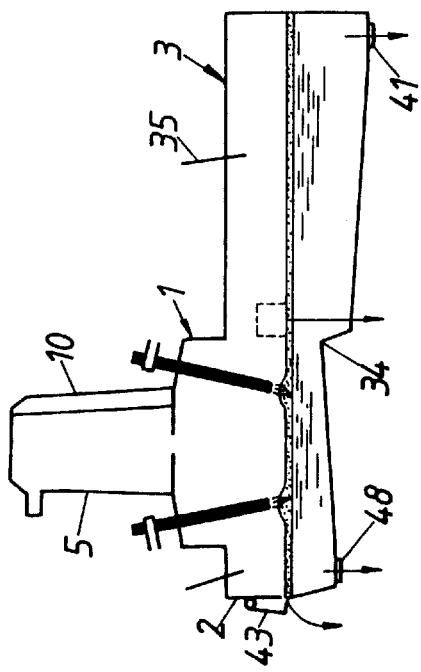

IRON SMELTING PROCESS AND PLANT ACCORDING TO THE MULTIPLE ZONE SMELTING PROCESS

The invention relates to a plant for the production of iron melts, in particular steel melts, such as crude steel melts, as well as a process for producing such melts.

The present standard aggregate used for the production of electric steel is an a.c. or d.c. electric arc furnace. The iron carriers charged, which are comprised of

- 70 to 100% steel scrap, directly reduced iron-sponge iron in various quantitative ratios and sometimes also iron carbide (at present, up to about 10 to 15% of the total charge), and
- 0 to 30% liquid and/or solid pig iron are melted by aid of one or several electric arcs using oxygen lance(s)—if desired, burner(s), nozzles and/or inert gas flushing—and under the addition of carbon carriers and slag formers. After this, the steel bath during a flat bath period (5 to 10 min) in an electric arc furnace is brought to the temperature and composition desired for tapping and is killed in the ladle during tapping. Energy and material consumption as well as plant productivity vary greatly as a function of the respective charging ratios and melting practice.

Due to the work-wide introduction of secondary metallurgical processes as well as a series of developments on the constructive, electric and technological sectors of electric arc furnaces, such as, e.g.,

- cooled panels and lids
- improved electrode qualities and the use of electrode cooling
- the introduction of d.c. electric arc furnaces in addition to a.c. electric arc furnaces
- elevated transfo outputs
- the use of burners, lances, nozzles and/or flushing bricks for melting, heating, refining, blowing in solids and/or inert gas flushing
- the use of current-carrying electrode brackets as well as electrode control
- the optimization of the shape and size of a furnace (including tap opening)
- a foamed slag operation
- scrap preheating of various types
- the use of sponge iron, if desired as a hot charge electric arc furnace melting has changed within the past two decades into a process both flexible and efficient in terms of charging substances an steel quality produced, more and more exhibiting substantial advantages over converter metallurgy and competing the same successfully.

With new process developments, important reductions of the melting time and the specific electric energy consumption and hence further reduction of the specific operating and investment costs of electric steel production in electric arc furnaces have been attained primarily by applying

- integrated scrap preheating and/or hot charging of sponge iron/hot-briquetted directly reduced iron
- continuous addition of a major portion of the charging substances (iron carriers, carbon carriers, fluxes, etc.) while minimizing the power-off time for carrying out charging operations
- optimum foamed slag operation
- cheaper primary energies (coal, natural gas, etc.) as a substitute for electric energy, including partial $CO/H_2$ afterburning within and/or above the foamed slag.

However, with the known processes for the production of electric steel by means of electric arc furnaces used as melting aggregates, the potential advantages of the above-mentioned process developments have been utilized to a limited extend only. Moreover, it has not been feasiable so far—despite an increasing demand—to process to liquid steel high portions of liquid pig iron and/or other carbon-rich iron carriers (sponge iron, iron carbide etc.) as well as problem scrap (used cars) of about 30 to 70% charged into electric arc furnaces, at a high productivity and energy utilization and, with car scrap, also without inadmissible loads on the environment. A technology and plant based on electric arc furnace technology and highly efficient under such conditions from an economic point of view are still missing.

The above-mentioned limitations with conventional electric arc furnaces are due exclusively to the configuration of the furnaces, which does not enable a quasi-stationary continuous process course. The operations of charging, melting, refining, heating and tapping take place on one side, by necessity more or less offset in time and with interruption (s) of the charge and current supply—at least before and after tapping—in order to obtain the desired composition and temperature (homogeneity and overheating in respect of the liquidus temperature) of the crude steel. The present process source in an electric arc furnace is discontinuous and hence limited in its performance. In this respect, the following is noted:

1) With already reached tap-to-tap times of 55 to 60 min for tap weights of 70 to 150 tons, the possibility of further reducing the power-off phases is strongly limited. The same holds for the power-on phases—since under such conditions the limits for an economic energy input per ton of charge and time unit—and hence for the overall melting time have almost been reached.

2) From a certain piece size, the continuous charging of scrap is hardly feasibly. Heavy and bulky scrap is charged by scrap baskets at power off.

3) In continuous charging as well as in refining and heating in the flat bath operation, which will take a substantially longer time with high charging portions of sponge iron and, in particular, of liquid pig iron and iron carbide (about 6.1% C), the actual transfo output, as a rule, is not completely utilized by electric arc furnaces.

From AT-B-295.566 a process for the continuous production of steel by melting prereduced ore and subsequently refining the melt of semi-steel to steel in an electric arc melting furnace comprising a melting hearth to which a refining zone and at least one slag depositing chamber are connected is known, in which prereduced iron ore is introduced into the electric arc zone of the melting heath in a lumpy or granular form, the metal is continuously agitated and set in a circulatory movement within the hearth and the metal is refined to steel while flowing through a refining zone by blowing in an oxygen-containing gas, whereas slag is caused to stream opposite to the metal at least along part of the length of the refining zone. The slag calms down in a slag depositing chamber without intensive mixing of the bath and then is tapped from the slag depositing chamber.

In that known process plant scrap and liquid pig iron may be charged, yet each in very limited amounts only. Discharging of the offgases takes place directly in the refining zone, i.e., not via the electric arc melting furnace. To prevent the melt from freezing in the refining zone, a high coke/coal addition is required in that known process. Consequently, that known process is applicable to a limited extent only, in the first place serving to produce crude steel from prereduced ore.

From DE-C 3 609 923 a process and an arrangement for continuously melting scrap to crude steel is known. In that process, which primarily is limited to scrap melting (no mention being made of charging liquid pig iron or directly reduced sponge iron), the heat of the furnace gases is utilized for heating the scrap. The scrap is preheated in a shaft centrally placed on the hearth-type furnace and is introduced centrally into the hearth-type furnace, thereby forming a scrap column supported on the bottom of the electric arc furnace under formation of a conical pile and capable of reaching up as far as to the scrap charging opening provided in the upper part of the scrap preheating shaft. Pivotable electrodes (preferably four electrodes) are symmetrically arranged about the scrap column in the electric arc furnace and assist in melting the scrap. The angle of inclination between the central axis of an electrode and a vertical line during scrap melting amounts to more than 20° for each of the electrodes. Thereby, the hearth-type furnace is exposed to a great thermal load, since the electric arcs are burning between the centrally introduced scarp column and the wall and lid of the hearth-type furnace. On the one hand, this causes an increased wear of the refractory lining and hence elevated material and time costs for doing repairs. In addition, a large portion of the input energy is imparted by radiation to the furnace walls and the furnace lid and thereby gets lost. Moreover, possible bridging within the scrap column—above the melt caverns melted into it by the electrodes—may cause precipitation of the scrap column (or parts thereof), which might lead to a break of the electrodes.

The invention aims at avoiding these drawbacks and difficulties and has as its object to provide a plant as well as a process for producing iron melt, which basically enable the charging of any iron carriers incurring in metallurgical practice and having various physico-chemical properties, such as iron scrap, liquid and/or solid pig iron, iron carbide, sponge iron, iron ore having different degrees of prereduction, sinter, scales, metallurgical dust, dried sludges, etc., in various quantitative compositions such that, for instance, if there is a shortage of one iron carrier another one may be used instead without capacity restrictions. At the same time, it is to be feasible to supply, and use as a heat carrier for the metallurgical process, treated organic light fraction, e.g., shredder light fraction, thus simultaneously disposing of the same.

To solve this object, a plant according to the invention is provided with the following characteristic features:

- an electric arc furnace vessel
- a refining vessel following upon the furnace vessel via a weir and including a bottom departing from the weir in an at least partially downwardly inclined manner and an oxygen supply means as well as an iron melt tap provided in its end region farther remote from the furnace vessel,
- a decanting vessel following upon the furnace vessel and having a common bottom with the furnace vessel, said decanting vessel being provided with a slag tap in its end region farther remote from the furnace the furnace vessel
- a supply means supplying liquid pig iron and opening into the furnace vessel
- a preheating shaft supplying solid iron carriers, said preheating shaft being arranged above the furnace vessel and opening into the furnace vessel via its lid via a gas-permeable cooled shut-off means, and
- a charging shaft arranged above the furnace vessel and opening into the furnace vessel via a gas-impermeable cooled shut-off means.

Preferably, the preheating shaft is arranged centrally above the furnace vessel and the lid of the furnace vessel is designed to be annular so as to surround the preheating shaft and connect the same with side walls of the furnace vessel, wherein electrodes, preferably graphite electrodes, project into the interior of the furnace vessel through the lid in an oblique manner, if desired in a perpendicular manner. This enables particularly short tap-to-tap times, i.e., the addition of solid iron carriers, such as scrap, within short intervals, efficient preheating of the solid iron carriers being safeguarded by controlling/adjusting the preheating temperature and supply speed of the same.

Preferably, the electrodes are mounted so as to be pivotable and optionally displaceable longitudinally in the direction of their longitudinal axes while changing the angle of inclination between a vertical line and a central axis of the electrodes, preferably within a range of 0 to 30° in the direction of the center of the furnace vessel and up to 10° in the opposite direction towards the wall of the furnace vessel.

Suitably, the electrodes are switched cathodically and a bottom anode is arranged in the center of the bottom of the furnace vessel.

The plant will be applicable in a particularly universal manner, if the electrodes are configured as hollow electrodes and are connected either to an iron carrier supply means and/or a coal or carbon carrier supply means and/or a supply means for treated organic light fraction and/or a slag former supply means and/or a hydrocarbon supply means and/or an inert gas supply means.

Preferably, nozzles and/or lances opening into the interior of the furnace vessel may also be provided, which are connected either to an iron carrier supply means and/or a coal or carbon carrier supply means and/or a supply means for treated organic light fraction and/or a slag former supply means and/or a supply means supplying oxygen or an oxygen-containing gas and/or a hydrocarbon supply means and/or an inert gas supply means, said lances suitably being mounted so as to be movable, in particular pivotable and/or displaceable in their longitudinal directions.

According to a preferred embodiment, nozzles and/or lances are arranged in the refining vessel, which are connected either to an iron carrier supply means and/or a coal or carbon carrier supply means and/or a supply means for treated organic light fraction and/or a slag former supply means and/or a supply means supplying oxygen or an oxygen-containing gas and/or a hydrocarbon supply means and/or an inert gas supply means, said nozzles suitably being configured as sub-bath nozzles and/or bottom flushing bricks.

The lances advantageously are mounted so as to be movable, in particular pivotable and/or displaceable in their longitudinal directions.

In order to enable the furnace vessel to be completely emptied even with the central arrangement of a bottom anode, the furnace vessel suitably is equipped with a bottom downwardly inclined in the direction towards the decanting vessel, merging into an approximately horizontally located bottom part of the decanting vessel, the lowermost point of the bottom being provided in the decanting vessel, wherein advantageously a tap opening is provided on the lowermost point of the bottom of the decanting vessel.

To offer simple control over the process proceeding in the plant even with extended refining vessel, the refining vessel advantageously is provided with at least one inspection and/or repair opening.

Since the brick lining of the refining vessel subject to a stronger chemical attack by the slag rich in iron oxide and also to a greater thermal load and hence a greater wear than that of the furnace vessel, the refining vessel suitably is designed as a structural unit separable from the furnace vessel and exchangeable.

The metal bath levels in the furnace vessel and in the refiner may be equal or different (e.g., lower in the refiner, in which case the operation of the plant is effected without a continuous bath provided between the furnace vessel and the refiner).

According to a modified advantageous embodiment, the refining vessel is devised in the fashion of a ladle, in whose lid region the weir provided between the furnace vessel and the refining vessel is arranged.

To allow for an efficient slag control, a further slag tap as well as a detachable slag dam advantageously are provided in the region of the transition from the furnace vessel to the refining vessel.

For the purpose of rendering repair work easier, the preheating shaft and/or the charging shaft advantageously are configured as a unit separable from the furnace vessel and exchangeable.

According to a preferred embodiment, a process for the production of iron melts, in particular steel melts, such as crude steel melts, is characterized by the combination of the following characteristic features:

charging of liquid pig iron into the furnace vessel in an amount of from 20% to 70% of the total amount of the iron carriers to be charged, melting of scrap and/or other solid iron carriers having an oxidic iron portion (directly reduced sponge iron, hot-briquetted sponge iron, iron carbide, prereduced ore, dust briquets, etc.) in the furnace vessel substantially in an amount complementing the pig iron charge to the total charge, wherein the scrap at first is charged into the preheating shaft and is preheated by drawing off hot offgases formed in the production of the iron melt and injecting said offgases into the preheating shaft containing the scrap to be preheated and subsequently is charged into the furnace vessel, and wherein, furthermore, the solid lumpy iron carriers at first are charged into the charging shaft and from there are charged into the furnace vessel without preheating, yet optionally in the hot state, while supplying fine grained iron carriers into the furnace vessel and/or refining vessel through lances and/or nozzles and/or hollow electrodes, the iron carriers charged into the furnace vessel are melted by means of electric arc energy, thus mixing with the liquid pig iron, the iron melt formed therein flows through the refining vessel to the iron melt tap via the weir, being continuously refined and simultaneously heated both in the furnace vessel and in the refining vessel, and slat is allowed to flow to the slag tap in a direction opposite to the flow direction of the iron melt, being continuously reduced in respect of its FeO content and simultaneously cooled.

Advantageously, process gases are afterburn by feeding an oxygen-containing gas into and/or onto the slag and/or above the same into the refining vessel, into the furnace vessel and/or into the preheating shaft.

Suitably, melting of the scrap is assisted by blowing in an oxygen-containing gas.

The process according to the invention offers a wide range of applications. Advantageously, supplying of the charging substances (iron carriers, carbon carriers, fluxes, treated organic light fraction and gases), melting, refining and heating and discharging of the process products (crude steel, slag and offgases) into the preheating shaft and/or into the charging shafts and/or into the furnace vessel and/or into the decanting vessel and/or into the refining vessel are effected continuously or semi-continuously with discontinuous crude steel tapping from the refining vessel and without influencing/interrupting the process course in the immediately preceding/following plant parts.

Preferably, the metal bath level in the refining vessel is kept lower than that in the furnace vessel so as to avoid remixing.

BRIEF DESCRIPTION OF THE DRAWINGS

In the following, the invention will be explained in more detail by way of several exemplary embodiments schematically illustrated in the drawing, wherein FIG. 1 is a vertical section through a plant of the invention according to a first embodiment and FIG. 2 represents a section along line II—II of FIG. 1. FIG. 3 is a partially sectioned top view on the plant illustrated in FIG. 1. FIGS. 4 to 6 each show alternative embodiments in illustrations analogous to FIG. 1.

DETAILED DESCRIPTION OF THE PREFERRED EMBODIMENT

A furnace vessel 1 of a d.c. electric arc furnace on one side is provided with a decanting vessel 2 and on the opposite side with a refining vessel 3, i.e., is directly connected with each of these vessels 2 and 3 so as to constitute a coherent plant comprising three operating zones. The furnace vessel 1 of the electric arc furnace serves as a melting or melt reduction zone, the refining vessel 3 as a refining and heating zone and the decanting vessel 2 as a decanting zone. In the middle, i.e., centrally of the furnace vessel 1 a preheating shaft 5 including a gas-permeable and water-cooled shut-off device 6 is placed on its lid 4, into which preheating shaft metallic charging substances 7—primarily steel scrap, optionally also solid pig iron—may be charged, preferably by means of a conveying belt 8 through a filling opening 9. Parallel with the preheating shaft 5 there is provided at least one laterally directly neighboring charging shaft 10 (several charging shaft being preferred) likewise opening into the furnace vessel 1 and including a gas-impermeable and water-cooled shut-off device 11 oriented towards the furnace interior, which may be charged with solid lumpy iron carriers 12 (directly reduced iron, prereduced iron ore, sinter, scales, filter dust and/or sludge briquetes, etc.) and/or carbon carriers 13 (coke, pressed pars of organic light fraction etc.) and/or slag formers 14 (line, fluorspar, quartz sand, bauxite, etc.) via a conveying belt 15 or conveying belts. The unit comprised of the furnace vessel 1, the refining vessel 3, the decanting vessel 2, the preheating shaft 5 placed on top and the lateral charging shaft 10 constitutes the core of the plant according to the invention.

The furnace vessel 1 is equipped with several cathodically switched oblique graphite electrodes 16 optionally designed as hollow electrodes, which preferably are arranged symmetrical in respect of the electric arc furnace and the preheating shaft 5 placed on top. The electrodes 16 are pivotable within an angle of inclination ranging from 0 to 30° relative to the vertical in the direction towards the center of the furnace vessel 1 and up to 10° in the opposite direction towards the wall of the furnace vessel 1. The angle of inclination may be differently adjusted and/or controlled for each individual electrode 16. During the melting operation this angle usually is about 15 to 20°. Occasionally, the pivotability of the electrodes 16 may be omitted. A bottom anode provided centrally in the bottom 18 of the furnace vessel 1 serves as a counter electrode 17.

The metallic charging substances 7 preheated in the preheating shaft 5 by the rising hot offgases 19 are charged into the furnace vessel 1 of the plant continuously or in batches, exclusively under current feed. If this entails the risk of an electrode breaking, the electrodes 16 temporarily are pivoted out in the direction of the wall of the furnace vessel 1 at power on or are pulled upwards (power off). The charging of scrap 8 having a high single-piece weight (slab or billet or bloom remainders, bundles, etc.) takes place under short-term interruption of the current feed and lifting of the electrodes 16.

The charging of solid iron carriers 12 having oxidic iron portions (sponge iron, prereduced ore, dust briquets, etc.) and, if necessary of carbon carriers 13, such as coke, pressed parts of organic light fraction etc., and slag formers 14 (lime, fluorspar, quartz sand, bauxite, etc.), into the electric arc furnace is effected via the lateral charging shaft 10 continuously and/or in batches/discontinuously, independent of the charging operations occurring through the preheating shaft 5.

Likewise independent thereof, liquid pig iron 20 is supplied to the electric arc furnace continuously or in batches/discontinuously via a pig iron supply means 21 designed as a chute and opening into the furnace vessel 1. On the side of the furnace vessel 1 located opposite the chute, a door 22 is provided for controlling the process, for introducing an additional lance manipulator 23 and for carrying out maintenance work in the region of the furnace vessel 1.

As implied by the form of the plant, charging and melting within the furnace vessel 1 always takes place with a liquid sump 24. The latter renders feasible a nearly continuous quasi-stationary melting operation with foamed slag 25 and electric arcs 26 almost completely surrounded by the same, and hence at high transfo outputs and thermal efficiencies and at low noise emissions.

To meet the following demands
  processing of fine grained iron carriers 12' (e.g., iron carbide, sponge iron screening rejects, filter dusts, etc.)
  production and control of the foamed slag 25
  acceleration of the melting procedure of the charging substances 7, 12, 13, 14 by increased energy inputs into the electric arc furnace (including afterburning of CO and $H_2$ in the offgas 19 within or above the foamed slag 25) and balancing out concentration and temperature gradients within the melt bath 24 as well as
  replacement of a portion of the required electric energy by cheaper primary energies,
furthermore,
  fine grained iron carriers 12' and/or
  fine grained coal 13' or other carbon carriers (treated organic light fraction, e.g., shredder light fraction) and/or
  fine grained slag formers 14' (lime, fluorspar, etc.) and/or
  gaseous oxygen and/or other oxidizing gases 27 ($CO_2$, $H_2O$, etc.) as well as secondary air 28 and/or
  $CH_4$ or other hydrocarbons 29 and/or
  inert gases 30 ($N_2$, Ar) are supplied in controlled amounts adapted to local and time demands, via one or several hollow electrodes 16 for top-blowing at least one of the above-mentioned substances 12', 13', 14', 29, 30 excluding oxygen and oxygen-containing gases and/or
  protected and/or non-protected nozzles and/or lances 32 (movable and/or fixedly installed lances, optionally designed as combined lances/burners) at various points within the lid and wall regions of the electric arc furnace above and/or below the surface of the slag for top-blowing or blowing in at least one of the above-mentioned substances 12', 13', 14', 27, 28, 29, 30 and/or
  protected sub-bath nozzles 33 (preferably high-pressure nozzles) and/or bottom flushing bricks or sub-bath nozzles for blowing in at least one of the above-mentioned substances 12', 13', 14', 27 to 30, or flushing bricks for inert gases 30.

For reasons of clarity, not all of these devices have been entered in FIG. 1.

A certain amount of liquid sump 24 having formed, the metal melt 24 formed in the furnace vessel 1 runs over a weir 34 into the refining vessel 3 and there is refined and simultaneously heated till tapping. For this purpose, the refining vessel 3 comprises at least one, preferably several nozzles, namely protected (protected by natural gas—Ar, $CO_2$ and higher hydrocarbons being usable as protective gases as well) and/or non-protected nozzles (super-bath nozzles (afterburning) or high-pressure nozzles (sub-bath) and/or lances 35 (movable and/or fixedly installed lances, optionally designed as combined lances/burners) at various point in the lid and wall regions of the refining vessel above and/or below the surface of the slag for top-blowing/blowing in at least one of the substances 12', 13', 14', 27 to 30 and/or
protected sub-bath nozzles 36 (preferably high-pressure nozzles) and/or bottom flushing bricks for blowing in at least one of the substances 12', 13', 14', 27 to 30 as well as flushing bricks for inert gases 30, and/or
openings for the addition of lumpy iron carriers 12, carbon carriers 13 and slag formers 14—individually or in combination
wherein, according to a preferred variant design of the refining vessel 3, the following is provided:
Through several lances 35 exclusively gaseous oxygen 27 is top-blown. The lances 35 are arranged centrally in the lid 36 of the refining vessel 3 at approximately equal distances over the length of the refiner, are displaceable in the vertical direction and at the same time are pivotable within an angle of inclination of about 0 to 30° relative to the vertical in or against the flow direction 38 of the metal melt 24.
Through several protected sub-bath nozzles 36 and/or flushing bricks arranged between the lances 35 exclusively inert gas 30 ($N_2$ and/or Ar at any desired mixing ratios) is fed. The sub-bath nozzles 36 and/or flushing bricks are provided individually or in pairs centrally in the bottom and/or in the side walls over the length of the refining vessel 3.
Into the refining vessel 3 exclusively lumpy slag binders 14 (lime, fluorspar, quartz sand, bauxite, etc.) are supplied exclusively through the lid opening 39 by means of a conveying belt 40.
On each of the two long sides of the refining vessel 3 a control and repair opening 50 is each provided. The two control openings 50 are mutually offset in the longitudinal direction of the refining vessel 3.
By the addition of lumpy slag formers 14 through the lid opening 39 in the final lance interval in the flow direction of the metal 24 within the refining vessel 3—approximately above a crude steel tap opening 41—the dissolution of lime and the formation of a reactive refining slag 25 are accelerated, because the iron oxide content of the slag 25 in that partial region of the refining vessel 3 is constantly kept high by aid of the neighboring, final oxygen lance 35.

Driven by its own gravity as well as by the impetus imparted by the lances 35, the refining slag 25 moves along the refining vessel 3 in counterflow to the metal melt 24 in the direction of arrow 42 towards the furnace vessel 1, reaching metal melt 24 of constantly decreasing temperature and increasing content of accompanying elements (C, Si, Mn, P, S, etc.), thus heating and refining the same and being cooled and reduced by the same. In continuous operation with a continuous bath over the total length of the plant (as illustrated in FIG. 1), the slag 25 is tapped through a slag door 43 provided on the free end of the decanting vessel 2. In doing so, the amount of slag 25 present in the furnace vessel 1 and in the decanting vessel 2 can be additionally controlled by effecting a partial discharge of the slag 25 via a slag dam 24 through one or two laterally arranged slag door(s) 45 provided in the refining vessel—immediately before the entry of the slag into the electric arc furnace.

The advantages of such a "metal/slag counterflow movement" are as follows:

1) Low heat and iron losses by the slag 25 when leaving the decanting vessel 2 through the slag door 43, because, on the one hand, the slag 25 leaves the plant on the "cold side" and, on the other hand, socalled "raining out" of metal droplets from the slag 25 takes place in the decanting vessel 2 besides the iron oxide reduction occurring primarily within the furnace vessel 1.

2) Obtainment of the desired steel grade at a substantially lower consumption of slag formers 14 and a lower specific amount of slag 25, respectively, ("slag-poor" refining optionally feasible) and consequently at a lower refractory wear of the plant.

In the semi-continuous operation of the plant including batch tapping of the crude steel 24 from the refining vessel 3, overflowing of the slag 25 from the furnace vessel 1 into the refining vessel 3 is limited or prevented by the laterally insertable slag dam 44.

The hot offgases 19 formed within the refining vessel 3 at first get into the furnace vessel 1, mixing with the offgases forming there, before rising through the preheating shaft 5 and leaving the plant through an offgas duct 46 provided into the upper region of the preheating shaft 5. Depending on the local heat demands in the various part of the plant, the offgases, on their way are partially after burnt to an increasing extend, preferably by oxygen 27, optionally by air 28 or air/oxygen mixtures, via lances 32, 35 and/or nozzles 47. In doing so, high afterburning degrees amount to above 60% are technically feasible at certain charging ratios and under certain conditions of process control Thus, with the instant process and plant concept by far the major portion of the chemical and sensible heat of the offgases 19 is transferred to the metal bath 24 either directly within the refining vessel 3 and the furnaces vessel 1 or indirectly by preheating the charging substances 7 in the preheating shaft 5, thus being immediately utilized for the process.

A lower consumption of electric energy as compared to conventional electric arc furnaces without scrap preheating (by about 25 to 30%) and to discontinuously operated electric arc furnaces with integrated scrap preheating (by about 10 to 15%) results for the plant and process concept according to the invention with identical charging substances. The output increase as compared to a conventional electric arc furnace without scrap preheating at an approximately equal size and equipment of the electric arc furnace (transfo output, lances, burners, etc.) amounts to about 50%.

The conception of the individual parts of the plant, such as furnace vessel 1
preheating shaft 5 and lateral charging shaft 10
refining vessel 3 and
decanting vessel 2 is effected as a function of
the charging substances to be used, in particular iron carries
   7 (shape, size, composition, temperature and state of aggregation)
the production output desired
the demands in respect of steel quality
the mode of operation desired for the plant (continuous or semi-continuous—with discontinuous tapping), also in respect of the desired integration with preceding and/or consecutively arranged plants (e.g., for pig iron production, direct reduction, secondary metallurgical treatment, continuous casting, etc.)
the types and prices of the energy sources available.

The main goal in conception is to carry out the partial steps of the process, namely preheating, charging, melting or melt reduction, refining, heating and tapping, within the plant at the same time, yet locally offset and hence as independent of one another as possible, in different plant parts at a controllable course of operation under respectively favorable physico-chemical, reaction-kinetic and heat-technological conditions, i.e., so to obtain an overall plant comprised of nearly perfectly (highly effectively) working sectional reactors for a concrete case of application.

The plant configuration according to the invention enables the mutually independent emptying of the plant zone comprised of furnace vessel 1 and decanting vessel 2 (via tap opening 43) and refining vessel 3 via tap opening 41 without tilting of the overall plant being required, inspection and repair works in the hot state of any of these two zones thus being feasible in the respectively neighboring zone without interruption of the process course. According to the invention, all of the plant parts are firmly interlocked as a unit and immovable or untiltable during operation. Due to a preferred sectional configuration of both the lower vessel and the lid 4 and 37 of the plant, individual vessels in need of repair, such as the refining vessel 3, the furnace vessel 1 and/or the decanting vessel 2, or other plant parts respectively, can be exchanged upon lateral retraction (which also applies to the preheating shaft 5 and the charging shafts 10).

According to the invention, the plant configuration represented in FIG. 1 is preferred for continuous operation with a continuous bath extending over the total length of the plant. Such a continuous bath is adjustable at a high portion of carbon-rich iron carriers in the charge (e.g., at a charge of 30% steel scrap+30% sponge iron+40% liquid pig iron). However, different metal bath levels in the furnace vessel and in the refiner are also possible.

Some plant configurations preferred according to the invention with a view to alternative charge ratios are represented in FIGS. 4 to 6, wherein the plant configuration according to FIG. 4—as an alternative to FIG. 1—is provided for continuous operation with a continuous bath at a charge portion of liquid pig iron of at least 30%;
   the plant configuration according to FIG. 5 is intended for continuous or semi-continuous operation at a charge portion of liquid pig iron of up to about 30% at most; in semi-continuous operation the refining vessel 3 is tapped in batches; at a charge portion of liquid pig iron of <15% and without direct supply of solid carbon carriers 13, 13' into the refining vessel 3, a heated vessel, e.g. a ladle furnace 29, following upon the refining vessel is optionally provided;

the plant configuration according to FIG. 6 is provided for the borderline case of a continuous melting process without charging of liquid pig iron 20, with a heated vessel, e.g. a ladle furnace 49, being provided as a refining vessel 3 because of the major portion of refining work being omitted.

As is apparent from FIGS. 4 to 6, the shape and size of the refining vessel 3 and of the decanting vessel 2 in the first place, but also the size of the preheating shaft 5, the number, size, arrangement and application of the lateral charging shafts 10 as well as the transfo output required for the electric arc furnace are influenced by the charging ratios. With the carbon content of the charged iron carriers 7 and their liquid portion increasing, the refining vessel 3 and the decanting vessel 2 basically become narrower and longer (like a channel) with the specific transfo output of the electric arc furnace decreasing and vice versa. With a high, increasing portion of solid iron carriers 7 in the charge (e.g. in the charging substance range of from 70 to 100% scrap and/or directly reduced iron) the refining vessel 3 gradually assumes the shape of a shorter vessel as illustrated in FIG. 5 or of a ladle 49 as illustrated in FIG. 6. The transfo output of the electric arc furnace increases. In the borderline case of 100% solid charging substances the decanting vessel may be designed in a strongly shortened fashion.

Exemplary embodiment

The charge consists of 40% liquid pig iron 20, 30% mixed scrap 7 and 30% sponge iron pellets 12. The chemical composition of these charging substances is apparent from Table 1.

TABLE 1

Composition and Temperature of Charging Substances

| Liquid pig Iron | Mixed Scrap | Sponge iron | Lime | Brick lining |
|---|---|---|---|---|
| 4.30% C | 0.20% C | 85.50% Fe(met) | 92.8% CaO | MgO—C bricks |
| 0.50% Si | 0.20% Si | 5.90% FeO | 2.8% MgO | |
| 0.50% Mn | 0.50% Mn | 2.00% $Fe_2O_3$ | 2.7% $SiO_2$ | |
| 0.100% P | 0.020% P | 1.80% C | 1.5% $Al_2O_3$ | |
| 0.030% S | 0.020% S | 0.70% CaO | 0.030% S | |
| | 1.4% ashes | 0.40% MgO | | |
| | | 2.30% $SiO_2$ | | |
| | | 1.40% $Al_2O_3$ | | |
| 1330° C. | 25° C. | 25° C. | 25° C. | 1550° C. (furnace vessel 1) 1625° C. (refining vessel 3) |

A plant serves to carry out the process, which, in accordance with FIG. 1, for an output per hour of about 150 tons of crude steel is configured as follows:

a) Furnace vessel 1:

diameter about 6 m transfo output 55 MVA 4 pcs. of graphite electrodes 16 (diameter 350 mm, pivotable in the respective vertical plane within an angle of inclination of 0 to 30°)

one bottom anode 17 one pig iron chute 21 for continuously supplying liquid pig iron 20 one inspection and repair door 22

1 pc. of lance manipulator 23 (through door 22)

4 pcs. of oxygen lances 32 of self-consuming tubes through side walls of the furnace vessel 1 (lance diameter 1", intake oxygen pressure at entry ≧5 bars)

4 pcs. of bottom flushing bricks 33 for inert gas 30 ($N_2$/Ar adjustable at any desired quantitative ratio), max. gas flow rate about 200 Nl/min per flushing brick 33 (about 800 Nl/min max. inert gas flow rate in furnace vessel 1)

about 5 to 6° bottom inclination towards spare tap hole 48 in decanting vessel 2 b) A preheating shaft 5 for preheating and subsequently charging mixed scrap 7 into furnace vessel 1 octogonal constant shaft cross section (about 2.5 m inside width)

shaft height about 4 m total volume about 25 m³, about 17.5 m³ thereof useful volume (capacity about 12 tons of mixed scrap 7)

including belt charging 8, gas-permeable water-cooled shut-off organs 6 (scrap retention means) and an offgas duct 46, yet without afterburning nozzles 47 c) 3 pcs. of lateral charging shafts 10 for sponge iron pellets 12 and lump lime 14 (no lateral charging shaft 10 on the side of the decanting vessel 2 and of the opening 9 for charging the preheating shaft 5 with mixed scrap 7)

rectangular cross section 1200×600 mm height 3.5 m useful volume about 2.2 m³ of a charging shaft 10 (capacity of the three charging shaft 10 about 12 tons of sponge iron pellets 12)

water-cooled and gas-tight shut-off organs 11 at the entry into the furnace vessel 1 charging of the three charging shaft 10 by means of a common conveying belt 15 and a distributing chute (the distributing chute not being illustrated in FIG. 1)

d) Refining vessel 3 width about 1.9 m, length about 6.0 m, bottom inclination in the direction of the crude steel tap hole 41 about 8 to 9° (the average angular cross section of the refining vessel 3 relative to brickwork being about 3 m²)

4 pcs. of water-cooled oxygen lances 35 (1-hole lances each, diameter of the lance nozzle about 1", oxygen pressure at entry about 10 bars) arranged centrally in the lid 37 of the refining vessel 3 at mutual distances of about 1.5 m and at distances of about 0.75 m from the narrow refiner sides, individually displaceable in the vertical direction and likewise individually pivotable within an angle of inclination of from 0 to about 30° in, and opposite to, the flow direction of the metal 24

6 pcs. of bottom blushing bricks 36 for inert gas 30 ($N_2$/Ar adjustable at any desired quantitative ratio) arranged in pairs (3 pairs) in the intervals between the lances 35 in the flat bottom region of the refining vessel 3 max. gas flow rate of about 200 Nl/min per flushing brick 36 (about 1200 Nl/min max. inert gas flow rate in refining vessel 3)

one tap hole for crude steel 41 two slag doors 45 one slag dam 44 two inspection/repair doors 50 e) Decanting vessel 2 width about 1.9 m, length about 0.9 m, having a nearly constant angular cross section of about 2.5 m² relative to brickwork 2 pcs. of bottom flushing bricks 33 (1 pair) in the flat bottom region of the decanting vessel 2, max. gas flow rate of about 200 Nl/min per flushing brick 33 (about 400 Nl/min max inert gas flow rate within decanting vessel 2)

one tap hole 48 (used only for emptying furnace vessel 1 and decanting vessel 2)

on slag door 43 for tapping slag 12.

In the instant case, the process course according to the invention takes place with a continuous bath over the total length of the plant at counterflow movements of metal 24 and slag 25 with a foamed slag 25 within the furnace vessel 1 and the decanting vessel 2 at continuous tapping of crude steel 24 through tap hole 41 and slag 25 through slag door 43 under quasi-stationary process conditions in respect of concentration and temperature profiles substance and heat flows as well as filling degrees and bath levels in each individual part of the plant.

This process course for continuously producing about 150 tons/hour (about 2.5 tons/min) of crude steel by the plant is guaranteed by the following process control.

During a first preparation phase, a continuous bath 14 is produced in plant parts 1 to 3 as a necessary starting prerequisite for the forthcoming continuous operation. To this end, about 90 tons of liquid pig iron 20 via the pig iron chute 21, and about 45 tons of mixed scrap 7 via the preheating shaft 5 (mixed scrap 7 in four batches of 11 to 12 tons each), are charged into the furnace vessel 1, about two thirds of the liquid pig iron 20 including only few scrap pieces flowing over into the neighboring refining vessel 3 with the tap hole 41 closed. Within the following approximately 40 to 45 minutes, the bath present in the refining vessel 3 is refined and heated by oxygen lances 35 while melting, refining and, again, heating take place in the furnace vessel 1 under power supply and application of the oxygen lances 32. The refined slag 25 formed in the refining vessel 3 is continuously tapped by means of the slag dam 44 exclusively through the two slag doors 45. The slag 25 formed in the furnace vessel 1 and in the decanting vessel 2 flows off through slag door 43.

The preparation phase is completed as soon as a continuous bath having the following characteristics has been adjusted in the two principal zones along the plant:

a) in the region of the furnace vessel 1 and the decanting vessel 2 about 60 tons of semi-steel (about 50 tons thereof in the furnace vessel 1 and about 10 tons in the decanting vessel 2)

having the composition and temperature:
about 1.40% C about 1550° C.
about 0.12% Mn
traces of Si b) in the region of the refining vessel 3 about 60 tons of semi-steel having the composition and temperature:
about 0.05% C about 1650° C.
about 0.13% Mn
traces of Si From that moment, it is switched over to continuous operation of the plant. The slag dam 44 is completely pulled out of the refining vessel 3 and the two slag doors 45 are shut. The continuous and/or semi-continuous supply of the following material and energy amounts per minute is started:

| Average supply per minute | effected via |
|---|---|
| a) into the furnace vessel 1 | |
| • about 823 kg mixed scrap 7 | preheating shaft 5\*) |
| • about 823 kg sponge iron pellets 12 and about 37.8 kg lump lime 14 | three charging shafts 10\*\*) |
| • about 1097 kg liquid pig iron 10 | pig iron chute 21 |
| • about 49 Nm³O₂ 13 and about 8.3 kg coke 51 (foamed slag) | four oxygen lances 32 one manipulator lance 23 |
| • about 580 kWh (about 35 MW) | electric energy |
| • about 0.7 Nm³ inert gas (N₂/Ar) | four bottom flushing bricks 33 |

\*)supply in batches (semi-continuous): one batch of about 10 tons of mixed scrap 7 every 12 minutes (5 batches × about 10 tons = about 50 tons of mixed scrap per hour);
\*\*)emptying and refilling in a predetermined order such that, while two of the charging shafts 10 are being emptied, the third charging shaft 10 is filled with sponge iron pellets 12 and lump lime 14;

| | |
|---|---|
| b) into the decanting vessel 2 | |
| • about 0.3 Nm³ intert gas 30 (N₂/Ar) | two bottom flushing bricks 33 |
| c) into the refining vessel 3 | |
| • about 52 Nm³O₂ 27 | four oxygen lances 35 |
| • about 41 kg lime and about 15 kg quartz sand\*) (both item 14) | one lid opening 39 |
| • about 1 Nm³ inert gas 30 (N₂/Ar) | six bottom flushing bricks 36 |

\*)for liquefying the slag in refining vessel 3

After a starting phase of about 30 minutes, a quasi-stationary continuous operation adjusts within the plant, producing and discharging the following products per minute:

| Average amount (per min). composition and temperature | | discharge via/direction |
|---|---|---|
| a) in and out of the refining vessel 3 | | |
| −2.5 tons of crude steel 24, 1650° C. | | tap hole 41/ |
| about: 0.05% C | 0.07% Mn | consecutively arranged |
| traces of Si | | plant |
| 0.006% P | 0.010% S | |
| 0.0025% N | 0.0500% O | |
| −about 86.5 kg slag 25, about 1600° C. | | overflow to furnace |
| about: 21% FeOₙ | 44% CaO | vessel 1 |
| 10.4% MgO | 18% SiO₂ | |
| 1.6% Al₂O₃ | 3% MnO | |
| 0.6% P₂O₅ | 0.11% S | |
| −about 74 Nm³ offgas, about 1650° C. | | transition to furnace |
| about: 52 vol. % CO | 35 vol. % CO₂ | vessel 1 |
| 11 vol. % N₂ | 1.3 vol. % O₂ | |
| 0.7 vol. % Ar | | |

| Average amount (per minute) composition and temperature | | discharge via/direction |
|---|---|---|
| a) in and out of the furnace vessel 1, decanting vessel 2 and preheating shaft 5 | | |
| −2.57 tons of semi-steel, about 1550° C. | | overflow to refining vessel 3 |
| about 1.40% C | 0.13% Mn | consecutively arranged |
| traces of Si | | plant |
| 0.015% P | 0.015% S | |
| 0.0030% N | 0.0030% O | |

-continued

| Average amount (per minute) composition and temperature | | discharge via/direction |
|---|---|---|
| –about 203 kg slag, about 1550° C. | | slag door 43/outside plant |
| about: 9% FeO$_n$ | 39% CaO | |
| 11% MgO | 25% SiO$_2$ | |
| 7% Al$_2$O$_3$ | 5% MnO | |
| 1.3% P$_2$O$_5$ | 0.11% S, about 2% Fe(met) | |
| –about 162 Nm$^3$ offgas, about 800° C. | | offgas duct 46/outside plant (after preheating of the mixed scrap 7 in preheating shaft 5 to about 500° C.) |
| about: 41 vol. % CO | 41.0 vol. % CO$_2$ | |
| 16.5 vol. % N$_2$ | <1 vol. % O$_2$ | |
| 0.5 vol. % Ar | | |

Some important process data per ton of crude steel are as follows:

| | | |
|---|---|---|
| a) | Charging substances (furnace vessel 1 + refining vessel 3) | |
| • | liquid pig iron | 439 kg/ton |
| • | mixed scrap | 329 kg/ton |
| • | sponge iron pellets | 329 kg/ton |
| • | oxygen (lances) | 40.5 Nm$^3$/ton |
| • | inert gas (N$_2$/Ar) | 0.8 Nm$^3$/ton |
| • | brick lining (wear) | 7.0 kg/ton |
| • | lime (92.8% CaO) | 31.5 kg/ton |
| • | quartz sand | 5.9 kg/ton |
| • | coke (foamed slag) | 3.3 kg/ton |
| • | graphite electrodes | 1.0 kg/ton |
| b) | Slag (% CaO/% SiO$_2$ = 1.55) | 81 kg/ton |
| c) | Offgas (crude gas including false air) | 66 Nm$^3$/ton |
| d) | Degree of afterburning in offgas (crude gas at about 800° C.) | |
| | CO to CO$_2$ | 0.50 |
| | H$_2$ to H$_2$O | 0.54 |
| e) | Electric energy | 230 kWh/ton |

What is claimed is:

1. A plant for the production of iron melt comprising:
   (a) a furnace vessel, for producing iron melt, said furnace vessel being provided with a lid and electric arc heating means,
   (b) a preheating shaft arranged above said furnace vessel and opening into it via a gas permeable cooled shut-off means,
   (c) means for charging scrap into said preheating shaft,
   (d) means for introducing hot off gases formed in the production of iron melt into said preheating shaft,
   (e) means for supplying liquid pig iron into the furnace vessel,
   (f) a charging shaft arranged above the said furnace vessel for charging solid lumpy iron carrier into said furnace vessel, said charging shaft opening into the furnace vessel via a gas permeable shut-off means,
   (g) lances for introducing iron carrier and/or coal or carbon and lances for introducing oxygen and/or nozzles and/or hollow electrodes for supplying fine grained iron carrier into said furnace vessel, and
   (h) a refining vessel adjacent to said furnace vessel, said refining vessel being provided with an iron melt tap,
   the bottom of said furnace vessel sloping upwardly toward said refining vessel, the bottom of said refining vessel directly communicating with the upper edge of the sloping bottom of the furnace vessel and sloping downwardly toward said iron melt tap,
   (i) a decanting vessel having a common bottom with the furnace vessel and being provided with a slag trap, located in the end region of the decanting vessel remote from the furnace vessel.

2. A plant according to claim 1, characterized in that the preheating shaft is arranged centrally above the furnace vessel and the lid of the furnace vessel is designed to be annular so as to surround the preheating shaft and connect the same with side walls of the furnace vessel, wherein electrodes project into the interior of the furnace vessel through the lid in an oblique manner.

3. A plant according to claim 2, characterized in that the electrodes are pivotable and optionally displaceable longitudinally in the direction of their longitudinal axes while changing the angle of inclination between a vertical line and a central axis of the electrodes.

4. A plant according to claim 3, characterized in that the electrodes are switched cathodically and a bottom anode is arranged in the center of the bottom of the furnace vessel.

5. A plant according to claim 1, characterized in that the electrodes are configured as hollow electrodes and are connected either to an iron carrier supply means and/or a coal or carbon carrier supply means and/or a supply means for treated organic light fraction and/or a slag former supply means and/or a hydrocarbon supply means and/or an inert gas supply means.

6. A plant according to claim 1, characterized in that nozzles and/or lances opening into the interior of the furnace vessel are provided, which are connected either to an iron carrier supply means and/or a coal or carbon carrier supply means and/or a supply means for treated organic light fraction and/or a slag former supply means and/or a supply means supplying oxygen or an oxygen-containing gas and/or a hydrocarbon supply means and/or an inert gas supply means.

7. A plant according to claim 6, characterized in that the lances are mounted so as to be movable.

8. A plant according to claim 1, characterized in that nozzles and/or lances are arranged in the refining vessel, which are connected either to an iron carrier supply means and/or a coal or carbon carrier supply means and/or a supply means for treated organic light fraction and/or a slag former supply means and/or a supply means supplying oxygen or an oxygen-containing gas and/or a hydrocarbon supply means and/or an inert gas supply means.

9. A plant according to claim 8, characterized in that the nozzles are configured as sub-bath nozzles and/or bottom flushing bricks.

10. A plant according to claim 8, characterized in that the lances are mounted so as to be movable.

11. A plant according to claim 1, characterized in that the bottom of the furnace vessel is downwardly inclined in the direction towards the decanting vessel, the decanting vessel has a bottom including an approximately horizontal bottom part of the decanting vessel, the lowermost point of the bottom being provided in the decanting vessel portion.

12. A plant according to claim 3, wherein the angle of inclination is within a range of 0 to 30° in the direction of the furnace vessel and up to 10° in the opposite direction toward the wall of the furnace vessel.

13. A plant according to claim 1, characterized in that refining vessel is provided with at least one inspection and/or repair opening.

14. A plant according to claim 1, characterized in that the refining vessel is a structural unit separable from the furnace vessel and exchangeable.

15. A plant according to claim 7, wherein the lances for introducing oxygen are pivotable or displaceable in their longitudinal directions.

16. A plant according to claim 1, characterized in that a further slag trap as well as a detachable slag dam are provided between the furnace vessel and the refining vessel.

17. A plant according to claim 1, characterized in that the preheating shaft and/or the charging shaft is/are configured as a unit separable from the furnace vessel and exchangeable.

18. A process for the production of iron melts, using a plant according to claim 1, characterized by the combination of the following characteristic features:

charging of liquid pig iron into the furnace vessel in an amount of from 20% to 70of the total amount of the iron carriers to be charged, melting of scrap and/or other solid iron carriers having an oxidic iron portion in the furnace vessel substantially in an amount complementing the pig iron charge to the total charge, wherein the scrap at first is charged into the preheating shaft and is preheated by drawing off hot offgases formed in the production of the iron melt and injecting said offgases into the preheating shaft containing the scrap to be preheated and subsequently is charged into the furnace vessel, and wherein furthermore, the solid lumpy iron carriers at first are charged into the charging shaft and from there are charged into the furnace vessel without preheating, yet optionally in the hot state, while supplying fine grained iron carriers into the furnace vessel and/or refining vessel through lances and/or nozzles and/or hollow electrodes, the iron carriers charged into the furnace vessel are melted by means of electric arc energy, thus mixing with the liquid pig iron, the iron melt formed therein flows through the refining vessel to the iron melt tap via the weir, being continuously refined and simultaneously heated both in the furnace vessel and the refining vessel, and slat is allowed to flow to the slag tap in a direction opposite to the flow direction of the iron melt.

19. A process according to claim 18, characterized in that process gases are after burnt by feeding an oxygen-containing gas into and/or onto the slag and/or above the same into the refining vessel, into the furnace vessel and/or into the preheating shaft.

20. A process according to claim 18, characterized in that melting of the scrap is assisted by blowing in an oxygen-containing gas.

21. A process according to claim 18, characterized by supplying the charging substances comprising, carbon carriers, fluxes, treated organic light fraction and gases, melting and refining the iron carriers discharging the process products comprising crude steel, slag and offgases into the preheating shaft and/or into the charging shafts and/or into the furnace vessel and/or into the decanting vessel and /or into the refining vessel continuously or semi-continuously with discontinuous crude steel tapping from the refining vessel and without influencing/interrupting the process course in any immediately preceding or following operations.

22. A process according to claim 18, characterized in that the metal bath level in the refining vessel is kept lower than that in the furnace vessel.

23. A process according to claim 18, wherein the iron melt is a crude steel melt.

24. A plant according to claim 8, wherein the lances for introducing iron carriers and/or coal or carbon are pivotable or displaceable in their longitudinal directions.

25. A plant for the production of iron melts , comprising:

an electric arc furnace vessel, a refining vessel in the form of a ladle furnace, said lade furnace being connected to the furnace vessel via a weir disposed in a lid region of the ladle furnace, a slag dam, disposed at an adjacent bottom edge region of said electric arc furnace vessel near said lid region of said ladle furnace, to limit overflow of slag from said electric arc furnace vessel into said ladle furnace, a decanting vessel connected to the furnace vessel and having a bottom extending from and aligned wit ha bottom of the furnace vessel, said decanting vessel being provided wit ha slag tap in a region of the decanting vessel which is farthest from the electric arc furnace vessel, a preheating shaft supplying solid iron carriers, said preheating shaft being arranged above the electric arc furnace vessel and connected to the electric arc furnace vessel via a gas-permeable cooled shut-off means disposed in a lid of the electric arc furnace vessel, and a charging shaft arranged above the furnace vessel and connected to the electric arc furnace vessel via a gas-impermeable cooled shut-off means.

26. A plant according to claim 2, wherein the electrodes are graphite electrodes.

* * * * *